United States Patent Office 2,705,623
Patented Apr. 5, 1955

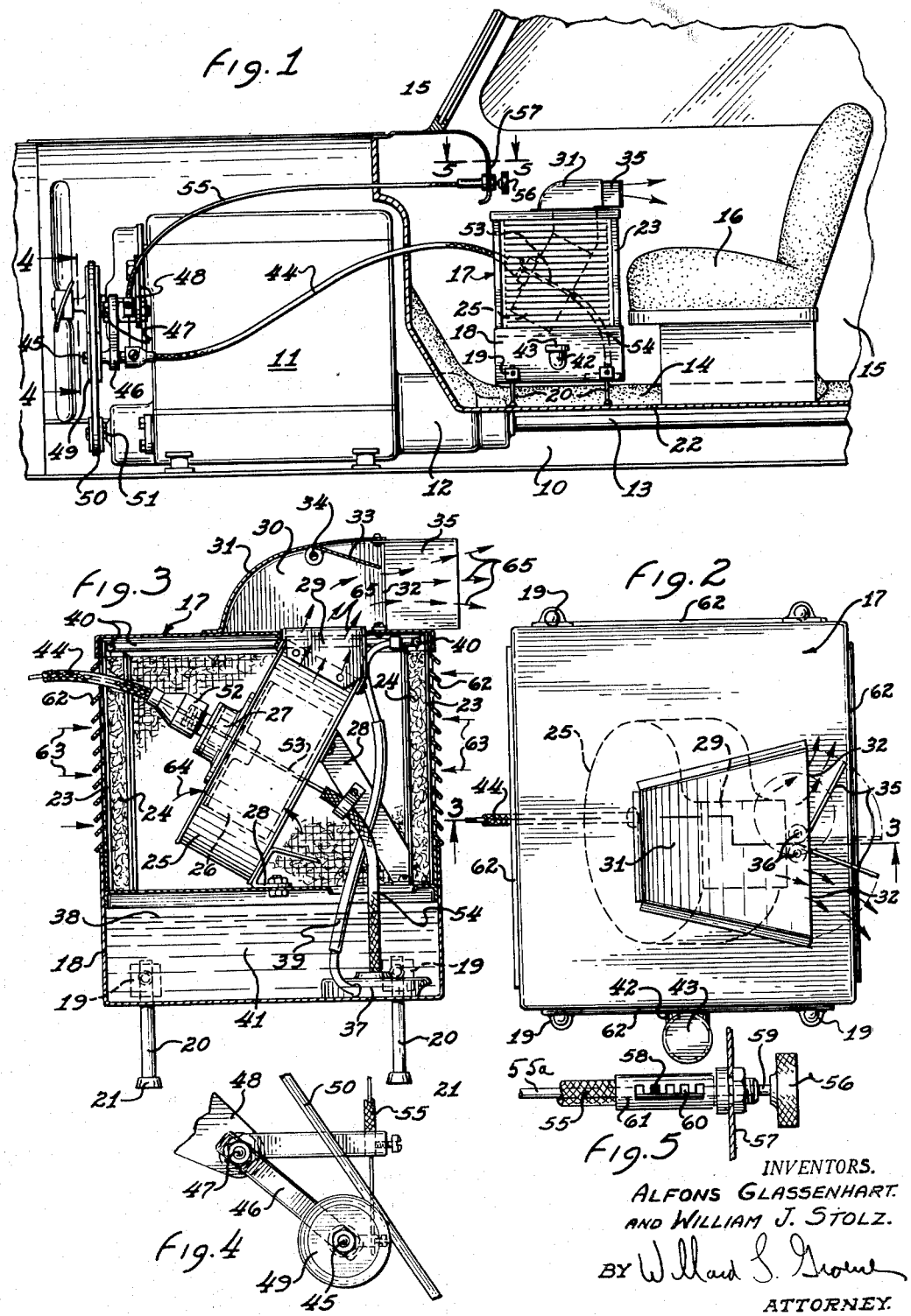

2,705,623

AUTOMOBILE AIR CONDITIONING APPARATUS AND DRIVE THEREFOR

Alfons Glassenhart and William J. Stolz, Phoenix, Ariz.

Application November 17, 1952, Serial No. 320,955

4 Claims. (Cl. 261—29)

This invention pertains to improvements in air conditioning apparatus and is particularly directed to improvements in automobile air conditioning apparatus.

One of the objects of this invention is to provide a simplified and highly efficient air conditioning apparatus for automobiles.

Another object of this invention is to provide an improved automobile air conditioning apparatus which is highly efficient in operation and yet low in manufacturing cost and in installation difficulties.

Still another object of this invention is to provide an improved automobile air conditioning device which may be quickly installed in the vehicle with a minimum of alteration and labor being required to adapt the apparatus to the vehicle.

Another object of this invention is to provide an improved automobile air conditioning apparatus in which there is a silent flexible shaft drive for the blower and water pump associated with said device.

Another object of this invention is to provide an improved automobile air conditioning apparatus which is driven from the main crankshaft of the vehicle engine through a common flexible drive transmission means for operating the blower and water pump associated with the air conditioning unit.

Still another object of this invention is to provide an evaporative type of air conditioning unit for a motor vehicle driven from the main drive engine which may be varied in speed relative to said main drive engine by appropriate control means so the operator may obtain the desired degree of cooling independent of the speed of the vehicle and drive engine.

Further features and advantages of this invention will appear from a detailed description of the drawings in which:

Fig. 1 is a fragmentary longitudinal section through a motor vehicle in which has been installed the automobile air conditioning apparatus incorporating the features of this invention.

Fig. 2 is a plan view of the air conditioning unit positioned in the passenger compartment of the motor vehicle.

Fig. 3 is a section on the line 3—3 of Fig. 2.

Fig. 4 is a section on the line 4—4 of Fig. 1.

Fig. 5 is an enlarged section on the line 5—5 of Fig. 1.

As exemplary of one embodiment of this invention there is shown a motor vehicle having a chassis 10 upon which is carried the main drive engine 11 having the usual transmission 12 and drive shaft 13 extending rearwardly through the tunnel or dome portion 14 of the body 15. The front seat 16 usually extends across the full width of the vehicle body 15 and at the intermediate portion and directly in front thereof and over the tunnel portion 14 is preferably positioned the air conditioning unit indicated generally at 17.

The unit 17 comprises the base or water containing pan portion 18 to which are fixed the lugs 19 in which are vertically adjustable the legs 20 having floor contacting rubber knobs 21 which engage the floor 22 of the vehicle body 15 each side of the dome portion 14. While the unit may be bolted to the floor, if desired, it has been found through experience that this arrangement is quite stable under normal operating conditions of the vehicle with the legs 20 and ends 21 resting and straddling each side of the dome portion 14.

The upper portion of the unit 17 above the base and pan member 18 has a frame work 23 around all four sides of which are vertically disposed the evaporative cooler pads 24. In this portion 23 is mounted a blower housing 25 which it is to be noted is arranged in an angularly disposed position relative to the horizontal and vertical sides of the unit as a whole. In the blower housing 25 is mounted the blower 26 journaled on a suitable bearing at 27 in the supporting frame work 28 rigidly secured to the members 18 and 23 of the unit. A discharge outlet 29 from the blower housing 25 opens into the distributing manifold chamber 30 of the air discharge outlet member 31. The outer discharge opening 32 of the member 31 is provided with a louvre 33 adjustably pivotally mounted at 34 for controlling the up and down distribution of the air from the outlet 32 while a pair of adjustable louvres 35 adjustably pivotally mounted at 36 may be adjusted to effect the sidewise or horizontal distribution of the air from the outlet 32.

A water pump 37 is disposed in the bottom of the reservoir or pan member 18 below the water level 38 and has a discharge outlet tube 39 connected to a water distributing manifold 40 located above the pads 24 so as to keep these pads saturated properly during the operation of the device, the water returning to the reservoir supply of water 41 by dripping off of the pads 24 back into the pan member 18. A suitable filler 42 having a filler cap 43 is utilized to maintain a suitable supply of water 41 in the member 18, the supply being arranged usually to accommodate about 150 to 200 miles of driving in proportion to the fuel requirements of the motor vehicle.

The drive for effecting energization of the cooler unit is of extremely simple and efficient design and also may be regulated to determine the rate of speed for the blower 26 and water pump 37 independent of the main drive motor 11 which is the prime driving power for the air conditioning apparatus. This drive comprises a flexible drive shaft 44 which is supported at its forward end on a shaft 45 journaled in a pivotally mounted bracket 46 mounted on a pivot connection 47 in turn carried in a bracket 48 secured suitably to the main drive engine 11. A drive pulley 49 is operatively connected to the flexible drive member of the shaft 44 and engages the fan belt 50 or other equivalent output drive power from the main crankshaft 51 of the drive motor 11. The other end of the flexible drive shaft is coupled by suitable connecting means at 52 to the blower 26. An output connection comprising a shaft 53 passing clear through the fan 26 is also connected through a flexible drive shaft 54 to actuate the water pump 37. It is important to note that the flexible drive shaft from the input pulley 49 to the shaft 45 is a straight line drive without any sharp kinks or right angle gear connections to the blower 26 and continuing on through the shaft 53 the flexible drive shaft 54 to the water pump 37 so that the entire group of units is connected together in a positive non-back-lash connection to the input pulley 49. This makes for simplicity in installation and noiseless operation. By setting the blower housing 25 and the blower fan 26 in an angularly disposed position simplicity of applying the flexible drive shaft 44 is obtained with a continuity of the drive clear on down to the water pump 37 as clearly illustrated in Figs. 1 and 3 of the patent drawings.

Further, the swinging movement of the bracket 46 is controlled by the manual control rod 55a sliding in the casing 55 which is operated by the pull and turnment knob 56 appropriately mounted on the dashboard 57 of the vehicle and having an index pin 58 connected to the rod 55a containing the knob 56 which operates in the elongated and notched slot 60 in the support member 61 to which is fastened the casing 55, Fig. 5. By this arrangement the contact of the input drive pulley 49 may be not only fully connected or fully disconnected for regulating the on and off operating condition for the air conditioning apparatus, but the tension and relative pressure of the pulley 49 on the drive belt 50 may be varied so as to effect a predetermined slip condition between the belt 50 and pulley 49. By this novel arrangement the speed of the fan 26 and water pump 37 may be determined independent of the absolute speed of the main drive engine 11. In other words, in low speed driving the pulley 49 may be fully forcefully engaged with the belt 50 for a maximum drive of the air conditioning unit. However, in instance when open high speed driving is to be done, the pressure between the pulley 49 and belt 50 may be relatively decreased and slip allowed therebetween so that still the fan 26 and pump 37 are not driven at excessive speed but at a slower desired speed to give the predetermined amount of relative cooling desired independent of the absolute speed of the motor vehicle.

It will be noted that louvres 62 are provided on all four sides of the unit 17 for maximum intake of air as indicated by the arrow 63 through the evaporative pads 24 to the input of the blower housing indicated by arrows 64, discharge going out from the outlet 29 as indicated by the arrows 65.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In an air conditioning apparatus for an automobile comprising an evaporative cooler unit totally enclosed in a passenger compartment of said automobile having a base reservoir member, a series of vertically disposed evaporative pads mounted around the upper edge of said base member, an obliquely disposed blower housing mounted in said unit above said base member, an obliquely disposed blower fan shaft journaled in said housing, a blower fan fixed on said blower fan shaft, a discharge outlet from said blower housing located on top of said unit and discharging into said passenger compartment, air distributing baffles in said discharge outlet for directing the air flow in rearward, up-and-down, and sidewise directions in said passenger compartment, a water pump located in said base member, a vertically disposed pump input drive shaft in said pump, a flexible drive shaft interconnected between the top of said pump input drive shaft and the lower end of said blower fan shaft, downwardly extending support legs vertically adjustable and carried in each side of said base member to engage the floor in said passenger compartment, and a power input flexible drive shaft connection on the upper end of said blower fan shaft.

2. In an air conditioning apparatus for an automobile comprising an evaporative cooler unit totally enclosed in a passenger compartment of said automobile having a base, a reservoir member, a series of vertically disposed evaporative pads mounted around the upper edges of said base member to receive air directly from said passenger compartment, an obliquely disposed blower housing mounted in said unit above said base member, an obliquely disposed blower fan shaft journaled in said housing, a blower fan fixed on said blower fan shaft, a discharge outlet from said blower housing located on top of said unit, air distributing baffles in said discharge outlet for directing the air flow toward a front seat in a rearward, up-and-down, and sidewise direction in said passenger compartment, a water pump located in said base member, a vertically disposed pump input drive shaft for said pump, a flexible drive shaft interconnected between the upper end of said pump input drive shaft and the lower end of said blower shaft, and a flexible drive shaft connection on the upper end of said blower fan shaft.

3. In an air conditioning apparatus for an automobile comprising an evaporative cooler unit totally enclosed in a passenger compartment of said automobile comprising a base reservoir member, a series of vertically disposed evaporative pads mounted around the upper edges of said base member, an obliquely disposed blower housing mounted in said unit above said base member, an obliquely disposed blower fan shaft journaled in said housing, a blower fan fixed on said blower fan shaft, a discharge outlet from said blower housing located on top of said unit and air distributing baffles in said discharge outlet for directing the air flow in rearward, up-and-down, and sidewise directions toward a front seat in said passenger compartment, and a flexible drive shaft connection on the upper end of said blower fan shaft extending from said passenger compartment into driven engagement with an engine of said automobile.

4. In an air conditioning apparatus for an automobile comprising an evaporative cooler unit totally enclosed in a passenger compartment of said automobile having a base reservoir member, a series of vertically disposed evaporative pads mounted around the upper edges of said base member, an obliquely disposed blower housing mounted in said unit above said base member, an obliquely disposed blower fan shaft journaled in said housing, a blower fan fixed on said blower fan shaft, a discharge outlet from said blower housing located on top of said unit, air distributing baffles in said discharge outlet for directing the air flow in rearward, up-and-down, and sidewise directions toward a front seat in said passenger compartment, a flexible drive shaft connection on the upper end of said blower fan shaft extending into an engine compartment of said automobile adapted to be driven from an engine of said automobile.

References Cited in the file of this patent

UNITED STATES PATENTS

| Number | Name | Date |
|---|---|---|
| 1,574,094 | Iler | Feb. 23, 1926 |
| 2,148,161 | Isles | Feb. 21, 1939 |
| 2,162,512 | McPherson | June 13, 1939 |
| 2,169,664 | Shifflett | Aug. 15, 1939 |
| 2,184,488 | Conwell | Dec. 26, 1939 |
| 2,237,497 | Munford | Apr. 8, 1941 |
| 2,314,463 | Schwebs | Mar. 23, 1943 |
| 2,364,249 | Steele | Dec. 5, 1944 |
| 2,517,721 | Schleper | Aug. 8, 1950 |
| 2,631,021 | Arnold | Mar. 10, 1953 |

OTHER REFERENCES

Article on "Automobile Air Conditioning" in Refrigerating Engineering of January 1953, vol. 61, No. 1, pp. 31–44 inc.